(12) United States Patent
Abel et al.

(10) Patent No.: US 12,167,982 B2
(45) Date of Patent: Dec. 17, 2024

(54) SUPPLY DEVICE FOR PROVIDING AT LEAST ONE SUPPLY PRODUCT

(71) Applicant: ONDAL MEDICAL SYSTEMS GMBH, Hünfeld (DE)

(72) Inventors: Markus Abel, Fulda (DE); Hartmuth Kiel, Burghaun (DE); Stefan Oginski, Fulda (DE); Stefan Perplies, Hünfeld (DE)

(73) Assignee: ONDAL MEDICAL SYSTEMS GMBH, Hünfeld (DE)

( * ) Notice: Subject to any disclaimer, the term of this patent is extended or adjusted under 35 U.S.C. 154(b) by 903 days.

(21) Appl. No.: 17/289,806

(22) PCT Filed: Oct. 31, 2019

(86) PCT No.: PCT/EP2019/079939
§ 371 (c)(1),
(2) Date: Apr. 29, 2021

(87) PCT Pub. No.: WO2020/094519
PCT Pub. Date: May 14, 2020

(65) Prior Publication Data
US 2021/0393464 A1    Dec. 23, 2021

(30) Foreign Application Priority Data
Nov. 5, 2018   (EP) ................. 18204425.5

(51) Int. Cl.
*A61G 12/00*   (2006.01)
*F16M 13/02*   (2006.01)
*H01R 27/02*   (2006.01)

(52) U.S. Cl.
CPC ......... *A61G 12/004* (2013.01); *F16M 13/027* (2013.01); *H01R 27/02* (2013.01)

(58) Field of Classification Search
CPC ........ H01R 27/00; H01R 27/02; F16M 13/02; F16M 13/022; F16M 13/027; A61G 12/002; A61G 12/004
USPC ....................................................... 439/577
See application file for complete search history.

(56) References Cited

U.S. PATENT DOCUMENTS

| | | | |
|---|---|---|---|
| 9,057,934 | B2 | 6/2015 | Lellky et al. |
| 2006/0102811 | A1 | 5/2006 | Musset et al. |
| 2012/0140385 | A1 | 6/2012 | Yuan et al. |
| 2017/0014291 | A1 | 1/2017 | Tao et al. |

(Continued)

FOREIGN PATENT DOCUMENTS

| | | |
|---|---|---|
| CN | 102087816 A | 6/2011 |
| CN | 201897059 U | 7/2011 |
| CN | 202746868 U | 2/2013 |

(Continued)

*Primary Examiner* — Khiem M Nguyen
(74) *Attorney, Agent, or Firm* — MEDLER FERRO WOODHOUSE & MILLS

(57) ABSTRACT

The present invention relates to a supply device (1) for providing at least one supply product, comprising a mounting unit (2) for mounting the supply device on a support, preferably a ceiling of a room, and an extension arm (3), wherein the extension arm (3) is arranged pivotably around a vertical pivot axis (30) relative to the mounting unit. The extension arm (3) further comprises at least one terminal (4, 4', 4") which is directly integrated with the extension arm (3) for a supply device.

16 Claims, 3 Drawing Sheets

(56) References Cited

U.S. PATENT DOCUMENTS

Figure 1:
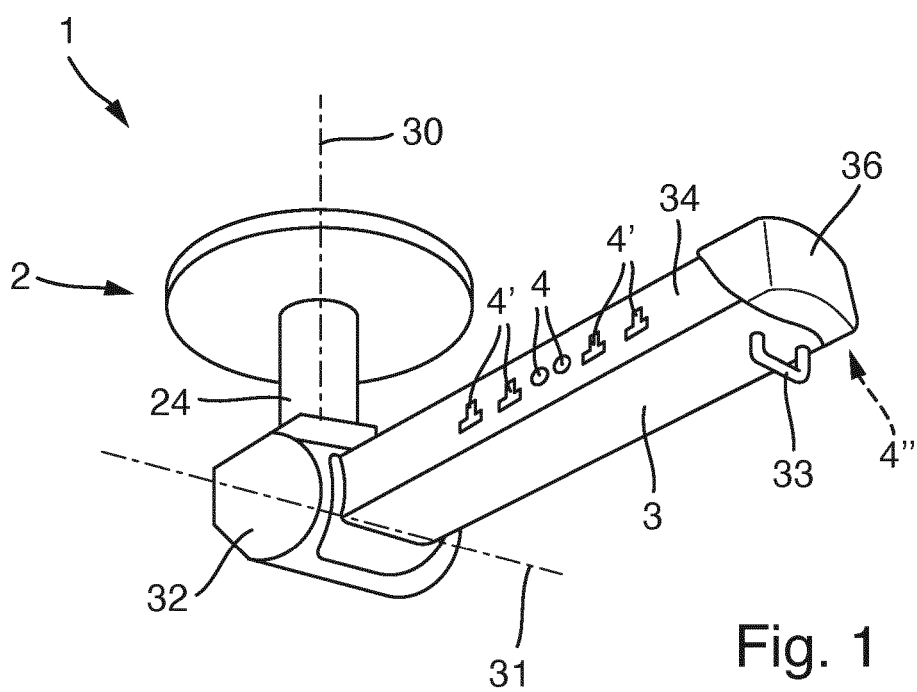

2017/0341232 A1* 11/2017 Perplies ................ B25J 9/1694
2021/0393464 A1* 12/2021 Abel .................... A61G 12/004

FOREIGN PATENT DOCUMENTS

| CN | 104653988 A | 5/2015 |
| CN | 107101137 A | 8/2017 |
| CN | 207500768 U | 6/2018 |
| DE | 19748480 A1 | 5/1999 |

* cited by examiner

SUPPLY DEVICE FOR PROVIDING AT LEAST ONE SUPPLY PRODUCT

TECHNICAL FIELD

The present invention relates to a supply device for providing at least one supply product.

BACKGROUND ART

In medical institutions, for example clinics, hospitals, medical practices, and similar institutions, it is known to provide supply products, like electrical power supply, data, or medical gases, which may be required in a treatment room, by means of a supply device.

Known supply devices are here combined with a support device to one system. Typically, the support device comprises an extension arm which is arranged opposite to a mounting unit arranged on the ceiling of the treatment room as being pivotable around at least one pivot axis. The actual supply device is connected to the extension arm by means of an interface or coupled hereto, respectively. The support device thus represents the interface to the ceiling and defines the possible range of motion and radius of movement, while the supply unit in turn provides the supply of electrical power, data, and medical gases.

With the known combinations, thus, an interface is always required which connects both subsystems, the support device, and the supply unit, with one another. This structure requires a large number of components and, accordingly, a large number of assembly steps to connect the support device and the supply unit. In addition, there are grooves at the junctions between the support device and the supply unit, which make disinfection of the system consisting of support device and supply unit more difficult.

It is also known to manually release the movement of the supply unit mounted on the extension arm via a manually operated locking mechanism, thus the supply unit may be moved or pivoted to another position, or to lock the movement of the supply unit by means of the locking mechanism, thus the supply unit is fixed at its position. Such kind of locking mechanisms are used, where appropriate, in case the supply unit has a considerable permanent weight.

PRESENTATION OF THE INVENTION

Based on the known state of the art, it is an object of the present invention to provide an enhanced supply device for providing at least one supply product.

Said object is achieved by a supply device for providing at least one supply product comprising the features of claim 1. Advantageous further developments result from the dependent claims, the specification, and the figures.

Correspondingly, a supply device for providing at least one supply product is disclosed, comprising a mounting unit for mounting the supply device on a support, preferably a ceiling of a room, and an extension arm, wherein the extension arm is arranged pivotably around a vertical pivot axis relative to the mounting unit. According to the invention, the extension arm comprises at least one terminal for a supply product which is directly integrated with the extension arm.

As the extension arm has at least one terminal for a supply product which is directly integrated with the extension arm, a separate supply unit to be mounted on the extension arm for providing the supply product may be omitted. This way, it is possible to achieve a slimmer design compared to conventional supply devices. Furthermore, this results in a simpler structure, as also the components that would be required to connect the extension arm and the otherwise required supply unit are omitted. Due to the reduced material and parts requirements, the assembly effort and the manufacturing costs may be reduced.

Basically, the extension arm is more preferably formed integrally essentially along the longitudinal extension thereof. In other words, the extension arm is formed as a substantially continuous individual part extending in a longitudinal extension or longitudinal direction. Thus, there are no junctions between the area of the extension arm in which the at least one terminal for a supply product is arranged and the pivotable connection to the assembly unit. This is opposed to conventional supply devices, in which the extension arm is provided only as a connecting unit between the connection to the mounting unit and a supply unit mounted on the extension arm as a separate component, which includes the terminals for a supply product. Therefore, usually the extension arm has substantially no grooves between the joint connection to the assembly unit and the at least one terminal for a supply product.

In addition, by integrating the at least one terminal with the extension arm, a greater passage height can be provided for a person, for example medical staff, as this is the case with supply devices having a separate supply unit. In addition, the required space of the supply device is reduced compared to conventional devices.

As there are no grooves at the junctions between the extension arm and the supply unit, which is not required, a cleaning, in particular disinfection, of the supply device may also be facilitated. In addition, this makes it more difficult for germs to settle and/or colonize on the supply device. Consequently, the overall hygienic conditions may be improved.

Here, "vertical" denotes in particular an orientation parallel to the direction of gravity.

The extension arm preferably comprises a joint unit in which a first articulated bearing is integrated for providing the pivotability of the extension arm about the vertical pivot axis, and a second articulated bearing is integrated for providing the pivotability of the extension arm about the horizontal pivot axis. Preferably, the extension arm is spaced from the mounting unit by a column extending from the mounting unit to the joint unit. Optionally, the joint unit may comprise a joint case, which accommodates the joint unit.

Furthermore, the extension arm may have an end cover at its free end opposite to the pivotable connection to the mounting unit in order to cover or close the free end face of the extension arm.

According to a preferred embodiment, a plurality of terminals is integrated with the extension arm. Thus, a plurality or even all of the required products may be provided by the extension arm.

Preferably, at least one terminal is arranged on a side of the extension arm and/or a bottom side of the extension arm. This way, the variability of the supply device and the reachability of individual terminals may be enhanced.

According to a further preferred embodiment, a terminal is configured as a power supply terminal, as terminal for digital and/or analogous data, and/or as terminal for a medical gas, wherein a terminal for a medical gas is preferably configured to provide oxygen ($O_2$), medical air, so called "Aer medicalis", carbon dioxide ($CO_2$), nitrous oxide ($N_2O$), Xenon (Xe), nitric oxide (NO), Helium (He), nitrogen ($N_2$), carbon monoxide (CO) and/or hydrogen sulfide (H₂S). Thus, it is possible to provide nearly all or even all of the required supply products by means of the supply device.

In case the extension arm comprises an operating grip for positioning the extension arm, an operator, for example, medical staff, may simply alter the position of the extension arm by operating the operating grip. In a preferred further development, an operating grip comprises at least one operating element, by means of which an electric, magnetic, hydraulic, pneumatic, or other kind of support for positioning the extension arm may be activated and/or deactivated.

According to a further preferred embodiment, the operating grip is configured in a way that the at least one line and/or at least one hose may be mounted on the operating grip, preferably may be hooked into it. This way it is possible to provide a strain relief for a plug connection between the end of the hose or the line and a terminal.

In order to be able to additionally provide a higher variability of the supply device, the extension arm may further be pivotable about a horizontal pivot axis relative to the mounting unit at least within a predefined angular region.

Here, "horizontal" denotes in particular an orientation perpendicular to the vertical pivot axis.

According to a further preferred embodiment, a position of the extension arm relative to the vertical pivot axis and/or to the horizontal pivot axis may be fixed by friction, magnetism and/or pneumatics. This way it may be ensured that the extension arm remains safely in the posture or position thereof adjusted by an operator. Thus, it may be prevented that an unintended and unexpected movement of the extension arm results in damages of objects or injures people.

In order to support a displacement of the position of the extension arm relative to the vertical pivot axis and/or to the horizontal pivot axis, an engine unit, preferably an engine unit comprising an electric motor, may be integrated with the device for supporting a displacement of the position of the extension arm relative to the vertical pivot axis and/or to the horizontal pivot axis.

Alternatively or in addition, also a spring swivel stand which supports a displacement of the position of the extension arm relative to the vertical pivot axis and/or to the horizontal pivot axis may be integrated with the device.

Preferably, the spring swivel stand is configured in a way that the extension arm is held by the spring force provided by the spring swivel stand in a predetermined parking position, wherein the predetermined parking position preferably corresponds to an upper end position of the extension arm relative to the range of movement thereof, in particular the range of movement thereof around a horizontal pivot axis. Alternatively, or it in addition, the spring swivel stand may be configured in a way that the extension arm is held in a docking position, in which a simple contacting of at least one terminal by a respective plug is enabled. In a further development, the docking position may correspond to a lower end position of the exchange arm relative to the range of movement thereof, in particular to the range of movement around the horizontal pivot axis thereof. Preferably, the extension arm is held in the docking position by a targeted reduction of the spring force caused in the spring swivel stand in said position of the extension arm. Here, preferably, at least a spring, which at least partly provides the spring force of the spring swivel stand, is arranged relative to the horizontal pivot axis in a way that the spring does not generate a return torque around the pivot axis on the extension arm in the docking position or only to a very small degree, which drags the extension arm towards the upper end position.

According to a further preferred embodiment, the extension arm is configured as an integral extruded profile, preferably as extruded aluminum profile, and/or at least one terminal is formed in a replaceable and/or modular way. This way, it is possible to provide the extension arm in different lengths in a simple way, and to adapt the supply device to a respective deployment situation according to the requirements.

In case a structural separation of electric components is provided in the extension arm, in particular a power supply terminal, and/or a terminal for digital and/or analog data, and terminals for medical gases are provided, if required, a supply device which is configured in a particular safe way may be provided.

SHORT DESCRIPTION OF THE FIGURES

Figure 2:
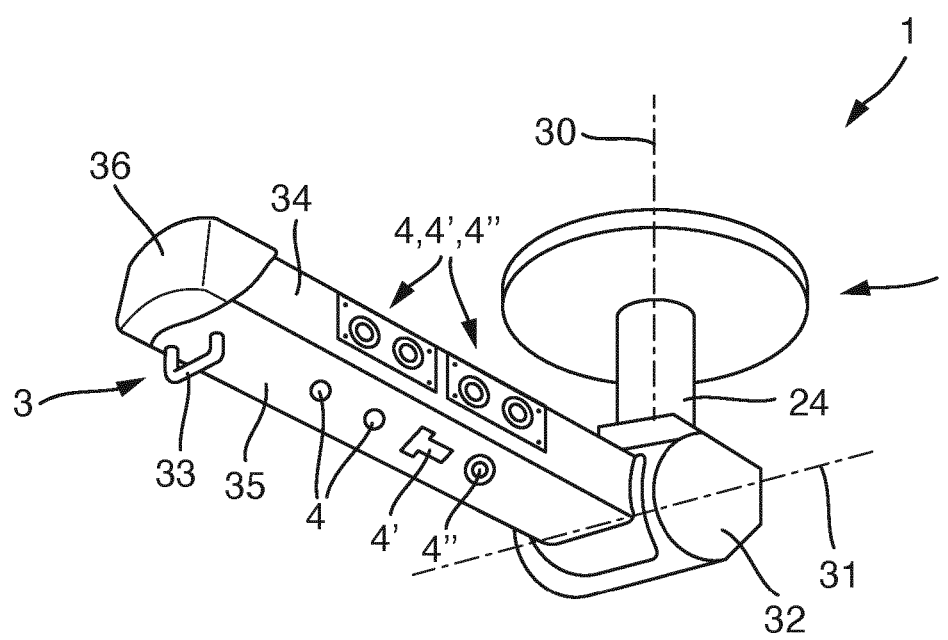
Figure 3:
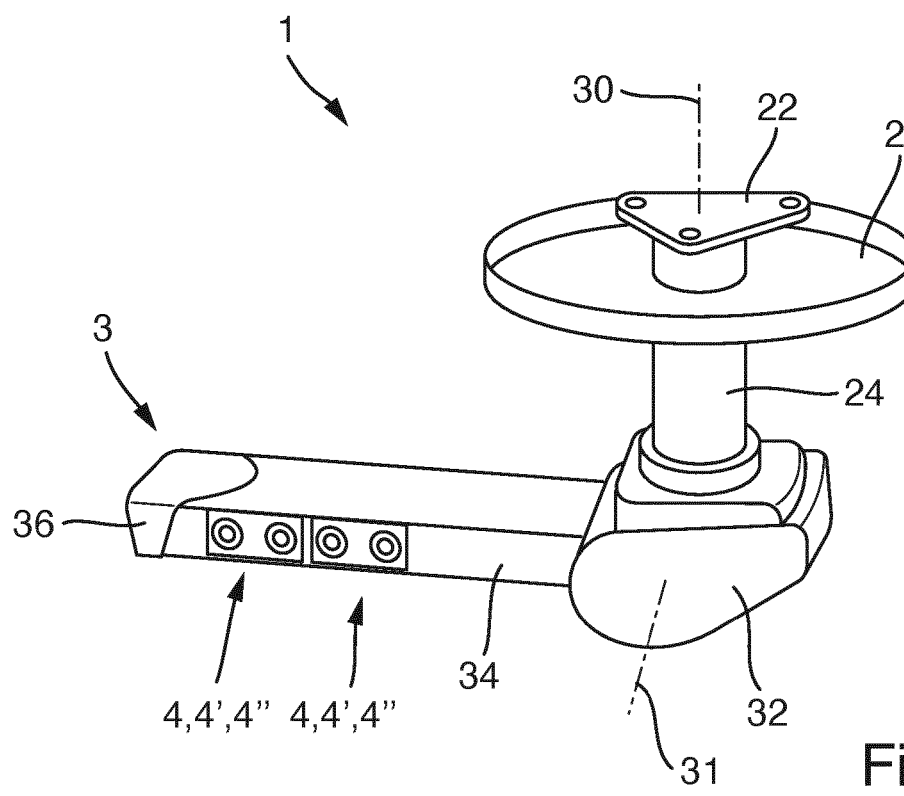

Preferred further embodiments of the invention will be explained by the following description of the figures in detail. Here shows:

FIG. 1 schematically a perspective side view of a supply device for providing at least one supply product according to a first embodiment;

FIG. 2 schematically a perspective side view of a supply device for providing at least one supply product according to a further embodiment; and FIG. 3 schematically the supply device of FIG. 2 in a further perspective side view.

DETAILED DESCRIPTION OF PREFERRED EMBODIMENTS

In the following preferred exemplary embodiments are described with reference to the figures. Here identical, similar or elements appearing identically are denoted by using the same reference signs in the different figures, and a description of said elements is partly omitted to avoid redundancies.

FIG. 1 is schematically a perspective side view of the supply device 1 for providing at least one supply product according to a first embodiment. The supply device 1 for providing at least one supply product comprises a mounting unit 2 for mounting the supply device on a support, preferably a ceiling of a room, and an extension arm 3, wherein the extension arm 3 is arranged pivotably around a vertical pivot axis 30 relative to the mounting unit 2. The extension arm 3 comprises a plurality of terminals 4, 4', 4" being directly integrated with the extension arm 3 for a supply product, which are provided on both sides 34 of the extension arm 3.

Here, the terminals 4 for the electrical power and the terminals 4' for digital and/or analog data are provided on the side 34 shown here. On the side of the extension arm 3 opposite to the side 34 shown here, a plurality of terminals 4" for a medical gas are further configured, wherein one terminal 4" is configured for a medical gas to provide oxygen $O_2$, medical air, carbon dioxide $CO_2$, nitrous oxide $N_2O$, Xenon Xe, nitric oxide NO, Helium He, nitrogen ($N_2$), respectively. Furthermore terminals 4" for providing carbon monoxide CO and/or hydrogen sulfide $H_2S$ may be configured.

The extension arm 3 further comprises an operating grip 33 for positioning the extension arm 3, which is formed in a way that at least one line and/or at least one hose may be mounted on the operating grip 33, preferably may be hooked into it.

In the present embodiment, the extension arm 3 is further pivotable relative to the mounting unit 2 around a horizontal pivot axis 31, at least within a predefined angular range. The angular range here extends between an orientation of the extension arm 3 perpendicular to the vertical pivot axis 30 in the direction of gravity to an angle of 45° relative to the orientation of the extension arm 3 perpendicular to the vertical pivot axis 30. Alternatively, also other angles may be predefined for the range, for example 15°, 30° or 60°.

The extension arm 3 is spaced from said mounting unit 2 by means of a column 24. The extension arm 3 preferably comprises a joint unit 32 in which a first articulated bearing is integrated for providing the pivotability of the extension arm 3 about the vertical pivot axis 30, and a second articulated bearing is integrated for providing the pivotability of the extension arm 3 about the horizontal pivot axis 31.

Furthermore, a friction arrangement is integrated with the joint unit 32 by means of which a position of the extension arm 3 may be fixed relative to the vertical pivot axis 30 by means of friction.

Alternatively or in addition, an arrangement may further be integrated with the joint unit 32, by means of which a position of the extension arm 3 relative to the horizontal pivot axis 31 and/or the vertical pivot axis 30 may be fixed by friction, magnetism and/or pneumatics.

Optionally, also an engine unit, preferably an engine unit comprising an electric motor, for supporting a displacement of the position of the extension arm 3 relative to the vertical pivot axis 30 and/or the horizontal pivot axis 31 may be integrated with the supply device 1, preferably in the joint unit 32.

In the present embodiment, in the joint unit 32, also a spring swivel stand for supporting a displacement of the position of the extension arm 3 relative to the horizontal pivot axis 31 is integrated with the supply device.

The joint unit 32 comprises an optional joint case which separates the interior of the joint unit 32 from the environment.

The extension arm 3 is configured as an extruded aluminum profile, wherein on the end thereof an end cover 36 is arranged. Therefore, the extension arm 3 is formed as a basically continuous integral part extending in the longitudinal direction, thus there are no junctions or grooves between the area of the extension arm 3, in which the terminals 4, 4', 4" are arranged, and the joint unit 32.

In order to enhance safety, a structural separation of electric components is provided in the extension arm 3, in particular, the terminals 4 for power supply, and/or the terminals 4' for digital and/or analog data, and the terminals 4" for medical gases.

FIG. 2 schematically shows a perspective side view of a supply device 1 for providing at least one supply product according to a further embodiment.

The supply device 1 basically corresponds to the one shown in FIG. 1. In addition however, it comprises the terminals 4, 4' on the bottom side 35 thereof.

Further, the terminals 4, 4', 4" on the sides 34 are configured as modules in a replaceable way.

FIG. 3 schematically shows the supply device 1 of FIG. 2 in a further perspective side view. Here, it is clearly seen that the mounting unit 2 comprises a flange 22 for a supporting attachment of the supply device 1 on a ceiling of a room which is to be equipped with the supply device 1. In order to enhance the hygiene, the flange 22 may be covered by a cover plate 20 which is movable along the vertical pivot axis 30.

Where applicable, any single features which are presented in the exemplary embodiment may be combined and/or replaced with one another without leaving the scope of the invention.

LIST OF REFERENCE NUMBERS

1 Supply device
2 Mounting unit
20 Cover plate
22 Flange
24 Column
3 Extension arm
30 Vertical pivot axis
31 Horizontal pivot axis
32 Joint unit
33 Operating grip
34 Side
35 Bottom side
36 End cover
4 Terminal for power supply
4' Terminal for digital data and/or analog data
4" Terminal for medical gas

The invention claimed is:

1. A supply device (1) for providing at least one supply product, comprising
a mounting unit (2) for mounting the supply device (1) on a support, and
an extension arm (3), wherein the extension arm (3) is a continuous individual part extending in a longitudinal extension and is arranged pivotably around a vertical pivot axis (30) relative to the mounting unit (2),
characterized in that
the extension arm (3) comprises a terminal (4, 4', 4") for a supply product which is directly integrated with the extension arm (3).

2. The device (1) according to claim 1, characterized in that a plurality of terminals (4, 4', 4") is integrated with the extension arm (3), and/or at least one terminal (4, 4', 4") is arranged on a side (34) of the extension arm (3) and/or a bottom side (35) of the extension arm (3).

3. The device (1) according to claim 1, characterized in that the terminal (4, 4', 4") is configured as a terminal (4) for power supply, as terminal (4') for digital and/or analogous data, and/or as terminal (4") for a medical gas.

4. The device (1) according to claim 1, characterized in that the extension arm (3) includes an operating grip (33) for positioning the extension arm (3).

5. The device (1) according to claim 1, characterized in that the extension arm (3) is further pivotable around a horizontal pivot axis (31) relative to the mounting unit (2), at least within a predefined angular range.

6. The device (1) according to claim 1, characterized in that a position of the extension arm (3) relative to the vertical pivot axis (30) and/or to the horizontal pivot axis (31) may be fixed by friction, magnetism and/or pneumatics.

7. The device (1) according to claim 1, characterized in that an engine unit, is integrated with the supply device (1) for supporting a displacement of the position of the extension arm (3) relative to the vertical pivot axis (30) and/or to the horizontal pivot axis (31).

8. The device (1) according to claim 1, characterized in that the extension arm (3) is configured as an extruded profile.

9. The device (1) according to claim 1, characterized in that in the extension arm a structural separation of electric components is provided as a terminal (4) for power supply, and/or a terminal (4') for digital and/or analog data, and the terminals (4") for a medical gas.

10. The device (1) according to claim 1, characterized in that a spring swivel stand for supporting a displacement of the position of the extension arm (3) relative to the vertical pivot axis (30) and/or the horizontal pivot axis (31) is integrated with the supply device.

11. The device (1) according to claim 1, characterized in that at least one terminal (4, 4', 4') is configured as replaceable and/or modular.

12. The device (1) according to claim 1, characterized in that the support is a ceiling of a room.

13. The device (1) according to claim 7, characterized in that the engine unit comprises an electric motor.

14. The device (1) according to claim 8, characterized in that the extension arm (3) is configured as an extruded aluminum profile.

15. The device (1) according to claim 3, characterized in that the terminal (4") for the medical gas is configured to provide oxygen ($O_2$), medical air, carbon dioxide ($CO_2$), nitrous oxide ($N_2O$), Xenon (Xe), nitric oxide (NO), Helium (He), nitrogen ($N_2$), carbon monoxide (CO) and/or hydrogen sulfide ($H_2S$).

16. The device (1) according to claim 1, characterized in that the extension arm (3) has no grooves between the mounting unit (2) and the terminal (4, 4', 4") for the supply product.

\* \* \* \* \*